(12) United States Patent
Raman et al.

(10) Patent No.: US 10,619,363 B2
(45) Date of Patent: Apr. 14, 2020

(54) ON-SITE DRYWALL FABRICATION SYSTEMS AND RELATED METHODS

(71) Applicant: RevolutioNice Inc., Belleville, NJ (US)

(72) Inventors: Sreenivas Raman, Park Ridge, NJ (US); Ryan J. Giovacchini, Hamilton, NJ (US)

(73) Assignee: RevolutioNice Inc., Belleville, NJ (US)

( * ) Notice: Subject to any disclaimer, the term of this patent is extended or adjusted under 35 U.S.C. 154(b) by 0 days.

(21) Appl. No.: 16/148,795

(22) Filed: Oct. 1, 2018

(65) Prior Publication Data

US 2019/0100928 A1 Apr. 4, 2019

Related U.S. Application Data

(60) Provisional application No. 62/565,889, filed on Sep. 29, 2017.

(51) Int. Cl.
*E04F 21/08* (2006.01)
*E04F 21/02* (2006.01)
*B62D 57/024* (2006.01)
*B62D 21/18* (2006.01)

(52) U.S. Cl.
CPC .............. *E04F 21/08* (2013.01); *B62D 21/18* (2013.01); *B62D 57/024* (2013.01); *E04F 21/026* (2013.01)

(58) Field of Classification Search
CPC ...................................................... E04F 21/08
USPC ............................................................ 156/43
See application file for complete search history.

(56) References Cited

U.S. PATENT DOCUMENTS

| | | | | |
|---|---|---|---|---|
| 1,783,098 A | * | 11/1930 | Potyie | E04F 21/08 118/44 |
| 1,786,362 A | * | 12/1930 | Palatini | E04F 21/08 118/410 |
| 2,877,641 A | * | 3/1959 | De Alencar Cabral | E04F 21/08 118/100 |
| 3,832,250 A | * | 8/1974 | Pearson | B28B 5/027 156/39 |
| 5,279,700 A | * | 1/1994 | Retti | E04F 21/165 118/679 |
| 5,342,566 A | * | 8/1994 | Schafer | B28B 1/525 264/102 |
| 5,578,327 A | * | 11/1996 | Tan | E04F 21/08 401/131 |

(Continued)

*Primary Examiner* — J C Jacyna
(74) *Attorney, Agent, or Firm* — Brient IP Law, LLC

(57) ABSTRACT

In particular embodiments, an on-site drywall fabrication system is configured to perform on-site construction of drywall (e.g., plasterboard, wallboard, gypsum panel, sheet rock, gypsum board, etc.) over at least a portion of a framed (e.g., studded) wall (e.g., comprising one or more substantially vertical studs). In particular embodiments, the on-site drywall fabrication system is configured to utilize one or more drywall installation robots to fabricate drywall substantially directly on a framed wall. Generally speaking, the on-site drywall fabrication system may be configured to generate a substantially continuous, seamless drywall panel that extends along a particular portion of a wall. The system may, for example, utilize one or more sprayers that are configured to spray a suitable fill material between a first wall material (e.g., a first wall material applied via the first wall material spool) and a second wall material.

19 Claims, 1 Drawing Sheet

(56) References Cited

U.S. PATENT DOCUMENTS

| | | | |
|---|---|---|---|
| 2006/0265999 A1* | 11/2006 | Dupre, Jr. | B28B 11/24 52/745.19 |
| 2013/0092055 A1* | 4/2013 | Hilken | B01J 6/001 106/772 |
| 2014/0138007 A1* | 5/2014 | Dubey | B28B 19/0092 156/41 |
| 2018/0038119 A1* | 2/2018 | Wang | E04F 21/16 |

* cited by examiner

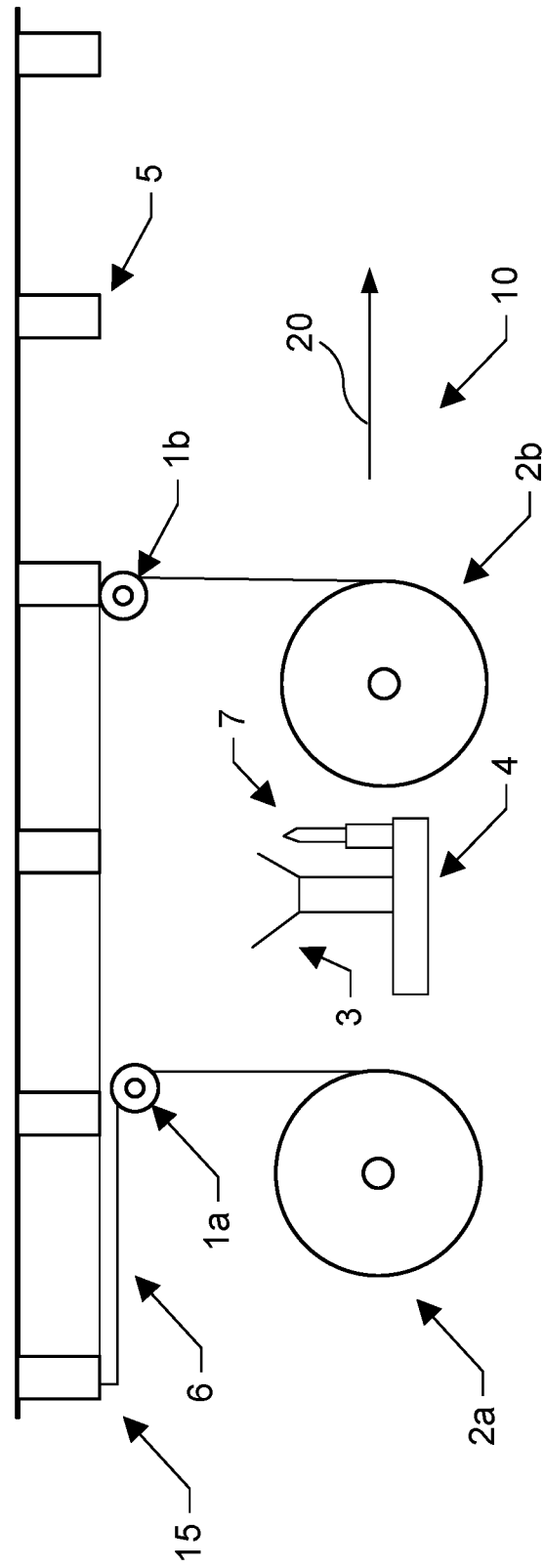

ON-SITE DRYWALL FABRICATION SYSTEMS AND RELATED METHODS

CROSS REFERENCE TO RELATED APPLICATION

This application claims priority to U.S. Provisional Patent Application Ser. No. 62/565,889, filed Sep. 29, 2017, the disclosure of which is hereby incorporated by reference in its entirety.

BACKGROUND

Finishing a framed-out wall can be a labor-intensive, costly process. Traditional drywall and plastering techniques may require specialized skills. Additionally, traditional drywall application may require taping of seams, spackling of nail holes, and other corrective aesthetic measures following installation. Accordingly, there is a need for improved systems and methods that address these and other needs.

SUMMARY

In various embodiments, an on-site drywall fabrication robot comprises: (1) a robot chassis comprising one or more wheels configured to support the on-site drywall fabrication robot adjacent a support surface and enable rolling movement of the on-site drywall fabrication robot across the support surface; (2) a first wall material spool support disposed adjacent the robot chassis, the first wall material spool support being substantially vertically oriented relative to the support surface and configured to support a first wall material spool comprising a backer layer material; (3) a second wall material spool support disposed adjacent the robot chassis, the second wall material spool support being substantially vertically oriented relative to the support surface, substantially parallel to and spaced apart from the first wall material spool support, and configured to support a second wall material spool comprising a face layer material; (4) one or more sprayers disposed between the first wall material spool support and the second wall material spool support; (5) one or more first rollers that correspond to the first wall material spool support; (6) one or more second rollers that correspond to the second wall material spool support; and (7) a computer controller configured. In particular embodiments, the computer controller is configured to: (1) operate the one or more wheels to cause the on-site drywall fabrication robot to traverse a studded wall; and (2) cause the one or more sprayers to spray a fill material between the backer layer material and the face layer material as the first wall material spool and the second wall material spool unwind along the studded wall while the on-site drywall fabrication robot to traverse a studded wall.

An on-site drywall fabrication robot comprising: (1) a robot chassis comprising one or more wheels configured to support the on-site drywall fabrication robot adjacent a support surface and enable rolling movement of the on-site drywall fabrication robot across the support surface; (2) one or more wall material spool supports; (3) one or more rollers that correspond to each of the one or more wall material spool supports; (4) a vertical motion platform; and one or more sprayers disposed on the vertical motion platform.

A method of fabricating drywall substantially directly on a studded wall, in particular embodiments, comprises: (1) providing a drywall installation robot comprising: (A) a robot chassis comprising one or more wheels configured to support the on-site drywall fabrication robot adjacent a support surface and enable rolling movement of the on-site drywall fabrication robot across the support surface; (B) one or more wall material spool supports; (C) one or more rollers that correspond to each of the one or more wall material spool supports; (D) a vertical motion platform; and (E) one or more sprayers disposed on the vertical motion platform; (2) selecting one or more suitable layer materials for use in the fabrication of the drywall; (3) placing a wall material spool comprising each selected one or more suitable layer materials on a corresponding wall material spool support on the drywall installation robot; (4) unspooling at least a portion of each wall material spool and running the spool along one or more corresponding rollers; (5) affixing an end of one or more of the wall material spools to an anchor stud on the studded wall; (6) causing the drywall installation robot to traverse the studded wall such that each of the wall material spools unspools along the wall as the drywall installation robot traverses the studded wall; (7) using the one or more sprayers on the drywall installation robot to spray a fill material between the wall material spools; (8) optionally using a fastener applicator on the drywall installation robot to at least partially insert one or more fasteners into each stud of the wall such that the fill material is sprayed around the fastener and the fastener is fully disposed within the outer drywall layer; and (9) allowing the fill material to dry until to produce finished drywall.

BRIEF DESCRIPTION OF THE DRAWINGS

Various embodiments of an on-site drywall fabrication system are described below. In the course of this description, reference will be made to the accompanying drawings, which are not necessarily drawn to scale, and wherein:

FIG. 1 is a top plan view of an on-site drywall fabrication system according to a particular embodiment.

DETAILED DESCRIPTION OF VARIOUS EMBODIMENTS

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, an on-site drywall fabrication system is configured to perform on-site construction of drywall (e.g., plasterboard, wallboard, gypsum panel, sheet rock, gypsum board, etc.) over at least a portion of a framed (e.g., studded) wall (e.g., comprising one or more substantially vertical studs). In particular embodiments, the on-site drywall fabrication system is configured to utilize one or more drywall installation robots to fabricate drywall substantially directly on a framed wall.

Generally speaking, the on-site drywall fabrication system may be configured to generate a substantially continuous, seamless drywall panel that extends along a particular portion of a wall. In this way, the on-site drywall fabrication system may at least partially eliminate a need to sand and spackle the drywall sheet following installation. In further embodiments, the on-site drywall fabrication system may substantially eliminate a need to hang pre-fabricated drywall sheets, tape one or more seams between the prefabricated sheets (e.g., using joint tape or other suitable tape), mud the one or more seams (e.g, using a suitable joint compound), etc.

In particular embodiments, as shown in FIG. 1, an on-site drywall fabrication system comprises a drywall installation robot chassis 10 comprising: (1) one or more wheels; (2) one or more rollers 1a-1b; (3) one or more wall material spools 2a-2b (e.g., mounted on one or more wall material spool supports); (4) a vertical motion platform 4; (5) one or more sprayers 3, which may, for example, be disposed on the vertical motion platform 4; (6) one or more computer controllers; and (7) one or more fastener applicators 7. These various components will be discussed more fully below.

In particular embodiments, the robot chassis 10 comprises one or more wheels (e.g., omni-directional wheels). In various embodiments, the one or more wheels are configured to support the robot chassis 10 adjacent a support surface (e.g., the ground, a suitable flooring surface within a building, etc.) and facilitate rolling movement of the robot chassis 10 across the support surface (e.g., along a studded wall). In particular embodiments, the one or more wheels are substantially free-rolling. In other embodiments, at least one of the one or more wheels may be motorized. In particular embodiments, the one or more wheels comprise one or more Mecanum wheels, which are configured to move the robot chassis 10 over a support surface in any direction (e.g., in any direction relative to an orientation of any particular wheel). In various embodiments, the one or more Mecanum wheels each comprise a conventional wheel (e.g., a substantially circular wheel) comprising a plurality of rollers disposed about its circumference (e.g., disposed such that an axis of rotation of each roller is 45 degrees to the plane of the wheel and at 45 degrees to a line through the center of the roller parallel to an axis of rotation of the wheel).

In still other embodiments, the one or more wheels comprise one or more omni wheels (e.g., one or more poly wheels) each comprising one or more discs disposed about its circumference which are perpendicular to the turning direction of the respective wheel. In still other embodiments, the one or more wheels may comprise any other suitable type of wheel (e.g., one or more casters, one or more standard wheels, one or more omni wheels etc.).

In particular embodiments, the one or more wheels are configured to facilitate a rolling movement of the robot chassis 10 along a studded wall (e.g., for the purposes of fabricating drywall substantially directly onto the studded wall as the robot chassis 10 traverses the studded wall).

In some embodiments, the robot chassis 10 comprises a distributed controller (e.g., computer controller) configured to control operation of one or more motors for powering operation of the one or more wheels. In some embodiments, each respective wheel of the one or more wheels (e.g., plurality of wheels) is controlled by a respective distributed controller. In various embodiments, each distributed controller is configured to cause the one or more motors to operate each respective wheel of the one or more wheels to cause the robot chassis 10 comprises to roll across the support surface (e.g., in any suitable direction). As may be understood by one skilled in the art, the distributed controller arrangement for each of the one or more wheels may enable the system (e.g., a master control system) to operate each of the plurality of wheels independently at one or more different velocities, one or more different accelerations, and/or one or more different directions.

As may be further understood from FIG. 1, the robot chassis 10 further comprises one or more rollers 1a-1b. As may be understood from this FIGURE, the one or more rollers 1a-1b may be configured to facilitate an unrolling of one or more material spools adjacent a studded wall (e.g., for the purposes of fabricating drywall that comprises the one or more material spools as at least one layer substantially directly onto the studded wall).

In various embodiments, the one or more rollers may at least generally correspond to a particular one of the one or more wall material spools 2a-2b (e.g., each of the one or more rollers may be associated with a particular wall material spool 2a-2b). As may be understood from FIG. 1, the one or more wall rollers 1a-1b that correspond to the particular one or more wall material spools may be configured to facilitate an unrolling of a material spool that is supported by the corresponding one or more wall rollers 1a-1b. For example, in the embodiment shown in FIG. 1, the wall roller 1a corresponds to the wall material spool 2a, and the wall roller 1b corresponds to the wall material spool 2b.

In some embodiments, each wall material spool may correspond to a plurality of rollers, which may include, for example, one or more upper rollers and one or more lower rollers. In such embodiments, each of the one or more upper rollers and one or more lower rollers may be substantially vertically aligned such that each of the one or more rollers is substantially co-facing with an adjacent roller. In this way, each of the one or more rollers that correspond to a particular wall material spool may cooperate to substantially evenly unspool the wall material spool along a full height of a studded wall as the robot chassis traverses the studded wall.

In the embodiment shown in FIG. 1, the one or more wall material spools 2a-2b comprise a first wall material spool 2a and a second wall material spool 2b. In other embodiments, the chassis 10 may comprise any other suitable number of wall material spools, which may, for example, correspond to a desired number of layers of material that will make up the finished wall. Exemplary materials which may be utilized in the fabrication of drywall using the system described herein are described more fully below.

In particular embodiments, such as the embodiment shown in FIG. 1, the robot chassis 10 further comprises a vertical motion platform 4. In various embodiments, the vertical motion platform is configured to translate vertically between a first position adjacent a base of a studded wall and a second position adjacent an upper portion of the studded wall. In particular embodiments, the vertical motion platform 4 is configured to move between the first and second position using any suitable lifting mechanism (e.g., along a suitable track using any suitable driving mechanism).

In various embodiment, the vertical motion platform 4 comprises one or more sprayers 3 disposed between the first wall material spool 2a and the second wall material spool 2b. In particular embodiments, the one or more sprayers are configured to spray a suitable fill material between a first wall material (e.g., a first wall material applied via the first wall material spool 2a) and a second wall material (e.g., a second wall material applied via the first wall material spool 2b). As may be understood from FIG. 1, the on-site drywall fabrication robot is configured to unspool the first and second wall material spools 2a-b as the on-site drywall fabrication traverses a studded wall (e.g., in direction 20), and the one or more sprayers 3 are configured to spray a fill material between the first wall material and the second wall material.

In particular embodiments, the one or more sprayers 3 are configured to spray an amount of fill material based in part on a desired thickness of the finished wall. In various embodiments the one or more sprayers are configured to spray from a base of a studded wall up to an upper portion of the studded wall (e.g., up to about 8 feet, up to about 10 feet, etc.). In some embodiments, the vertical motion platform 4 is configured to enable vertical motion of the one or more sprayers 3 to ensure substantially full spray coverage of fill material between the base and upper portion of the studded wall. In various embodiments, the one or more sprayers are configured to fill a space between a first and second material layer such that the fill material will dry to form a substantially solid sheet of drywall comprising the first and second layers. Exemplary fill materials according to particular embodiments will be discussed more fully below.

In some embodiments, the robot chassis 10 comprises one or more computer controllers. In various embodiments, the one or more computer controllers are configured to operate rolling movement of the robot chassis 10 along the support surface (e.g., using the one or more wheels). In other embodiments, the one or more computer controllers are configured to control operation of the one or more sprayers, which may include, for example: (1) adjusting a position of the one or more sprayers 3 (e.g., to ensure even coverage of fill material between the layers); (2) adjusting a pressure at which the one or more sprayers 3 spray the fill material (e.g., which may be based on a density of the fill material, viscosity of the fill material, desired wall thickness, etc.); (3) etc.

In still other embodiments, such as the embodiment shown in FIG. 1, the robot chassis 10 further comprises one or more fastener applicators 7, which may, for example, be configured to drive one or more fasteners through at least the second wall material and each stud 5 that makes up the studded wall. In particular embodiments, the one or more fasteners may include any suitable fastener such as, for example; (1) one or more nails; (2) one or more screws; (3) one or more staples; and/or (4) any other suitable fastener. In particular embodiments, the one or more fastener applicators may be configured to at least partially insert a fastener through the drywall such that the fastener is fully embedded within the resulting finished drywall and a stud. In this way, the on-site drywall fabrication system may fasten the fabricated drywall to a studded wall without requiring patching of one or more holes resulting from the use of fasteners. As may be understood from FIG. 1, the systems may be configured to insert the fastener between the two material spools such that a head of the fastener sits about halfway between the first and second material spool layers. In this way, the fill material may fill around the fastener, and the fastener may be fully enclosed by the outer material layer that makes up the drywall. By not piercing the outer layer of drywall, the system may preclude the need to patch a hole caused by the fastener.

Exemplary Wall Materials According to Particular Embodiments

Wall Material Spool Layers

Particular embodiments of an on-site drywall fabrication system may utilize any suitable material as the wall material spool described above (e.g., as a facer material, as a backer material, or as an intermediate layer material (e.g., in embodiments that include three or more material spools). In a particular embodiment, a particular wall material spool may comprise a suitable paper material (e.g., as a facer material or backer material). In particular embodiments, one or more of the material spool layers may comprise a corrugated paper (e.g., which may provide volume to the fabricated drywall). In various embodiments, an intermediate layer may comprise a corrugated paper, which may, for example, improve a strength of the resulting drywall, and reduce a thickness of the overall resulting drywall (e.g., which may conserve fill material).

In particular embodiments, the facer layer may comprise a suitable wallpaper or other prefinished paper layer (e.g., pre-painted, pre-primed, etc.). In such embodiments, utilizing a finished paper layer may eliminate a need to paint, prime, wallpaper, or otherwise finish the resulting drywall. In other embodiments, the facer layer may comprise one or more pre-applied textures or other finishing techniques.

In particular embodiments, the wall material spool may comprise any other suitable material that may act as a layer of the resulting drywall. In some embodiments, the selection of a suitable layer material may depend at least in part on a particular application or purpose of a room in which the drywall is being fabricated. For example, in particular embodiments, the wall material spool may comprise any suitable insulating layer (e.g., insulator). In other embodiments, the wall material spool may comprise a suitable acoustic dampening layer (e.g., comprising open cell rubber foam, melamine sponge, fiberglass, Owens Corning 703, etc.). In still other embodiments, the wall material spool may comprise Kevlar or other suitable para-aramid synthetic fiber. In other embodiments, any of the layers described herein may comprise a suitable plastic (e.g., scuff resistant plastic), rubber, or other suitable material.

In particular embodiments, one or more of the layers applied via the one or more wall material spools may include one or more metal layers (e.g., aluminum or other foil), for example, for use in a secure document facility. In such embodiments, enclosing a room in drywall containing a metal layer may create an at least partial faraday cage for at least partially blocking one or more electromagnetic fields (e.g., radio waves, wireless signals, etc.).

In still other embodiments, the one or more layers applied via the one or more wall material spools may comprise one or more electrical conductor wires. In a particular embodiment, the one or more electrical conductor wires may comprise an electrical conductor wire grid. By incorporating electrical wire as a layer of the resulting drywall, the system may at least partially eliminate a need to run electrical wire within a studded wall for the purpose of adding electrical outlets, switches, etc. In various embodiments, the electrical conductor wire grid may serve as a field programmable gate array configured to enable a user to add one or more switches, outlets, etc. to the finished drywall using one or more jumpers to energize necessary cables within the drywall to power the switches and/or outlets. In this way, the system may be configured to enable a user to add switches, etc. after the drywall has been fabricated, without having to run any electrical cable. In various embodiments, the electrical wire grid may operate in a manner substantially similar to a printed circuit board (e.g., mechanically supporting and electrically connecting electronic components using conductive tracks, etc.). In particular embodiments, the one or more wall material spools comprise a printed circuit board such as a flexible printed circuit board (e.g., for use as a particular layer of the finished drywall).

In other embodiments, one or more layers applied via the one or more wall material spools may comprise an inductive charging transmitter circuit (e.g., a transmitter circuit grid). In such embodiments, the system may be configured to produce drywall that is configured to magnetically support one or more outlets and/or switches and transmit power to the one or more outlets and/or switches using one or more inductive charging techniques (e.g., one or more resonant inductive coupling techniques). In such embodiments, each outlet (e.g., and/or switch) may comprise a receiver. In this way, the system may be configured to produce a finished wall that is configured to allow a user to adjust a location of one or more power outlets and/or switches substantially on the fly without having to run electrical wiring, make one or more holes in the finished drywall, etc.

In still other embodiments, the wall material spool may comprise any other suitable material such as, for example: (1) one or more wire spools (e.g., for use as a speaker); (2) one or more antennae (e.g., to repeat or transmit one or more signals such as a Bluetooth or WIFI signal or other suitable signal); (3) one or more cables in addition to the one or more electrical cables discussed above (e.g., Ethernet, telephone, fiber, coaxial, audio, optical, etc.); (4) one or more intermediate mesh layers; (5) etc.

Fill Material

In particular embodiments, the fill material that the on-site drywall fabrication system sprays between the layers described above may include any suitable fill material. In particular embodiments, the fill material may comprise any suitable substantially mold proof (e.g., mold proof), substantially fire-retardant (e.g., fire-retardant) material, or other suitable material.

In various embodiments, the fill material may comprise, for example: (1) spray foam insulation; (2) plaster; (3) fiber; (4) plasticizer; (5) a foaming agent; (6) a finely ground gypsum crystal (e.g., as an accelerator); (7) starch or other chelate; (8) one or more additives for decreasing mildew or increasing fire resistance; (9) one or more wax emulsions or silanes; (10) EDTA; (11) concrete; and/or (12) any other suitable material or combination of materials.

In particular other embodiments, the on-site drywall fabrication system is configured to insert one or more tubes, one or more pipes, etc. between an inner and outer drywall layer (e.g., as part of the fill material). In particular embodiments, the system may comprise one or more suitable 3-D printing heads for 3-D printing the one or more tubes and/or pipes. In particular embodiments, the system is configured to spray the fill material around the one or more tubes and/or pipes.

Exemplary Operation of an On-Site Drywall Fabrication System

Operation of an on-site drywall fabrication system may be understood from FIG. 1. As may be understood from FIG. 1, a method of fabricating drywall substantially directly on a studded wall may comprise one or more of the steps of: (1) providing a drywall installation robot (e.g., such as any suitable drywall installation robot described herein); (2) selecting one or more suitable layer materials for use in the fabrication of the drywall (e.g., one or more backers, one or more face layers, one or more intermediate layers, etc.); (3) placing each selected wall material spool on a corresponding wall material spool support on the drywall installation robot; (4) unspooling at least a portion of each wall material spool, running the spool along one or more corresponding rollers; (5) affixing an end of one or more of the wall material spools to an anchor stud 15, for example, using one or more suitable fasteners; (6) causing the drywall installation robot to traverse the studded wall such that each of the wall material spools unspools along the wall as the drywall installation robot traverses the studded wall; (7) using the one or more sprayers on the drywall installation robot to spray a fill material between the wall material spools; (8) optionally using a fastener applicator on the drywall installation robot to at least partially insert one or more fasteners into each stud of the wall such that the fill material is sprayed around the fastener and the fastener is fully disposed within the outer drywall layer; and (9) allowing the fill material to dry until to produce finished drywall. In various embodiments, the method may further include using one or more suitable drying or curing techniques to speed up the drying of the fill material.

In various embodiments, as the drywall installation robot traverses the studded wall, the one or more rollers work in combination with the anchored end of the material layers to maintain the material layers in tension (e.g., to ensure a substantially smooth drywall surface and even fill). In particular embodiments, the on-site drywall fabrication system is configured to fabricate drywall substantially directly onto a substantially planar (e.g., planar) wall. In other embodiments, the on-site drywall fabrication system is configured to fabricate drywall substantially directly onto a curved or other shaped wall (e.g., studded wall).

In some embodiments, the on-site drywall fabrication system is configured to substantially automatically navigate around corners in order to maintain a substantially continuous sheet of drywall. For example, in the case of an outside corner, the on-site drywall fabrication system is configured to maintain tension in the material layers as the on-site drywall fabrication robot turns around the outside corner. In the case of an inside corner, the on-site drywall fabrication system is configured to apply a vertical row of fasteners at the corner before making a turn, and continuing fabrication along the second wall.

ALTERNATIVE EMBODIMENTS

Various embodiments of an on-site drywall robot may include features in addition to or in place of those described above. Illustrative alternative embodiments are described below.

In some embodiments, a drywall fabrication robot may be configured to manufacture drywall directly onto a framed structure (e.g., studded wall, ceiling, etc.) in a factory setting. In such embodiments, the drywall fabrication robot may be configured to produce one or more finished walls as part of the production of a pre-fabricated building, home, or other structure. In various embodiments, the drywall fabrication robot may be configured to fabricate drywall as described herein directly to any suitable frames structure (e.g., a framed wall, a framed out ceiling structure, etc.). In particular embodiments, the framed structure may comprise one or more pieces of wooden framing timber, one or more metal studs, etc. In other suitable embodiments, the drywall fabrication robot may be configured to operate to fabricate drywall directly onto any other suitable structure.

In still other embodiments (e.g., in a factory setting described immediately above), a drywall fabrication robot may be embodied on one or more robotic arms (e.g., one or more six axis, two-axis, or other suitable robotic arms). In such embodiments, the drywall fabrication robot chassis described herein may be disposed on the robotic arm, and the robotic arm may be configured to operate movement of the chassis along the studded structure to which the robot is fabricating drywall. In such embodiments, the drywall fabrication robot may not include the wheels described herein.

In still other embodiments, the one or more wheels may be substantially free rolling, and the drywall fabrication robot may be configured to enable a worker to manually push the robot along the studded wall in order to facilitate its operation. In such embodiments, the robot may be configured to run along a suitable track, which may, for example, be placed in front of the studded wall.

In still other embodiments, the spray material may include a glue or other suitable adhesive.

In particular embodiments, a wall that has been produced in the manner described herein may have better insulative properties than a wall finished using sheets of drywall that are then taped, mudded, etc. As may be understood by one skilled in the art, the continuous nature of the on-site fabricated drywall may reduce a number of openings and other cavities that could promote airflow through the wall. As such, the use of the on-site drywall fabrication robot may result in a more energy efficient wall, room, home, etc.

In still other embodiments, the drywall fabrication robot is configured to spray insulation within the studded wall as the robot traverses the wall to prefill the wall with insulation prior to fabricating drywall on the studded wall. In this way, the system may eliminate the need to separately insulate the wall. In some embodiments, the drywall fabrication robot may configured to spray insulation within the studded wall and apply only a single, face layer when fabricating the drywall directly to the studded wall (e.g., via a single wall material spool).

In some embodiments, the properties of the resultant drywall may enable a smaller profile studded wall to be utilized. In such embodiments, a room with the same footprint may have a larger surface area due to a reduced wall thickness.

Various other embodiments of a drywall fabrication robot may be utilized in any other suitable application to fabricate drywall on any suitably shaped surface (e.g., curved, flat, angled, cornered, etc.).

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Furthermore, any combination of any features may be utilized in the context of any specific embodiment. For example, although one or more features may not be discussed in relation to one another, various embodiments of a paint robot may utilize any feature of component described herein in any combination. Although specific terms are employed herein, they are used in a generic and descriptive sense only and not for the purposes of limitation.

What is claimed is:

1. An on-site drywall fabrication robot comprising:
a robot chassis comprising one or more wheels configured to support the on-site drywall fabrication robot adjacent a support surface and enable rolling movement of the on-site drywall fabrication robot across the support surface;
one or more wall material spool supports;
one or more rollers that correspond to each of the one or more wall material spool supports;
a vertical motion platform; and
one or more sprayers disposed on the vertical motion platform, wherein:
the one or more wall material spool supports comprise a first wall material spool support and a second wall material support; and
the one or more sprayers are disposed between the first wall material spool support and the second wall material spool support.

2. The on-site drywall fabrication robot of claim 1, wherein:
the first wall material spool support is configured to support a first wall material spool; and
the second wall material spool support is configured to support a second wall material spool.

3. The on-site drywall fabrication robot of claim 2, wherein:
the on-site drywall fabrication robot is configured to unspool the first and second wall material spools as the on-site drywall fabrication robot traverses a studded wall; and
the one or more sprayers are configured to spray a fill material between the first wall material and the second wall material.

4. The on-site drywall fabrication robot of claim 3, wherein:
each of the one or more rollers are motorized; and
the on-site drywall fabrication robot is configured to unspool the first and second wall material spools through operation of the one or more rollers.

5. The on-site drywall fabrication robot of claim 1, wherein:
the one or more wall material spool supports further comprise a third wall material spool support; and
at least some of the one or more sprayers are disposed between the second wall material spool support and the third wall material spool support.

6. The on-site drywall fabrication robot of claim 5, wherein:
the third wall material spool support is configured to support a third wall material spool.

7. The on-site drywall fabrication robot of claim 6, wherein the first wall material spool support, the second wall material spool support, and the third wall material spool support are substantially vertically oriented and substantially parallel to one another.

8. The on-site drywall fabrication robot of claim 7, wherein the second wall material spool comprises an intermediate wall layer.

9. The on-site drywall fabrication robot of claim 8, wherein the intermediate wall layer comprises an intermediate wall layer selected from the group consisting of:
a metal layer;
a corrugated paper; and
a printed circuit board.

10. The on-site drywall fabrication robot of claim 9, wherein:
the on-site drywall fabrication robot is configured to unspool the first wall material spool, the second wall material spool, and the third wall material spool as the on-site drywall fabrication robot traverses the studded wall; and
the one or more sprayers are configured to spray a fill material between:
the first wall material and the second wall material; and
the second wall material and the third wall material.

11. The on-site drywall fabrication robot of claim 10, further comprising:
one or more fastener applicators, wherein the one or more fastener applicators are configured to drive a plurality of fasteners through the first wall material into one or more studs that make up the studded wall as the on-site drywall fabrication robot traverses the studded wall.

12. The on-site drywall fabrication robot of claim 10, further comprising a computer controller configured to control operation of the one or more wheels, the one or more sprayers, and the one or more rollers.

13. An on-site drywall fabrication robot comprising:
a robot chassis comprising one or more wheels configured to support the on-site drywall fabrication robot adjacent a support surface and enable rolling movement of the on-site drywall fabrication robot across the support surface;
a first wall material spool support disposed adjacent the robot chassis, the first wall material spool support being substantially vertically oriented relative to the support surface and configured to support a first wall material spool comprising a backer layer material;
a second wall material spool support disposed adjacent the robot chassis, the second wall material spool support being substantially vertically oriented relative to the support surface, substantially parallel to and spaced apart from the first wall material spool support, and configured to support a second wall material spool comprising a face layer material;
one or more sprayers disposed between the first wall material spool support and the second wall material spool support;
one or more first rollers that correspond to the first wall material spool support;
one or more second rollers that correspond to the second wall material spool support; and
a computer controller configured, wherein the computer controller is configured to:
cause the one or more sprayers to spray a fill material between the backer layer material and the face layer material as the first wall material spool and the second wall material spool unwind along the studded wall while the on-site drywall fabrication robot traverses the studded wall.

14. The on-site drywall fabrication robot of claim 13, wherein the one or more first rollers are substantially vertically aligned such that each of the one or more first rollers is substantially co-facing with an adjacent roller.

15. The on-site drywall fabrication robot of claim 14, further comprising:
a third wall material spool support that is substantially vertically oriented relative to the support surface, substantially parallel to and spaced apart from the first wall material spool support and the second wall material spool support, disposed between the first wall material spool support and the second wall material spool support, and configured to support a third wall material spool comprising an intermediate layer material, wherein the one or more sprayers are disposed between:
the first wall material spool support and the third wall material spool support;
the second wall material spool support and the third wall material spool support.

16. The on-site drywall fabrication robot of claim 15, wherein the computer controller is further configured for causing the one or more sprayers to spray a fill material between:
the backer layer material and the intermediate layer material; and
the intermediate layer material and the face layer material, as the first wall material spool the second wall material spool, and the third wall material spool unwind along the studded wall while the on-site drywall fabrication robot to traverse a studded wall.

17. The on-site drywall fabrication robot of claim 16, wherein the intermediate layer material comprises an intermediate layer material selected from the group consisting of:
a metal layer;
a corrugated paper; and
a printed circuit board.

18. The on-site drywall fabrication robot of claim 17, further comprising one or more fastener applicators, wherein the one or more fastener applicators are configured to drive a plurality of fasteners through the backer layer material into one or more studs that make up the studded wall as the on-site drywall fabrication robot traverses the studded wall.

19. A method of fabricating drywall substantially directly on a studded wall, the method comprising:
providing a drywall installation robot comprising:
a robot chassis comprising one or more wheels configured to support the on-site drywall fabrication robot adjacent a support surface and enable rolling movement of the on-site drywall fabrication robot across the support surface;
a first wall material spool support disposed adjacent the robot chassis, the first wall material spool support being substantially vertically oriented relative to the support surface and configured to support a first wall material spool;
a second wall material spool support disposed adjacent the robot chassis, the second wall material spool support being substantially vertically oriented relative to the support surface, substantially parallel to and spaced apart from the first wall material spool support, and configured to support a second wall material spool;
one or more first rollers that correspond to the first wall material spool support;
one or more second rollers that correspond to the second wall material spool support;
a vertical motion platform; and
one or more sprayers disposed between the first wall material spool support and the second wall material spool support;
selecting one or more suitable layer materials for use in the fabrication of the drywall;
placing a first wall material spool comprising a first one of the selected one or more suitable layer materials on the first wall material spool support on the drywall installation robot;
placing a second wall material spool comprising a second one of the selected one or more suitable layer materials on the second wall material spool support on the drywall installation robot;
unspooling at least a portion of each of the first wall material spool and the second wall material spool, and running the first one of the selected one or more suitable layer materials along the one or more first rollers and the second one of the selected one or more suitable layer materials along the one or more second rollers;
affixing a respective end of the first one of the selected one or more suitable layer materials and the second one of the selected one or more suitable layer materials to an anchor stud on the studded wall;
causing the drywall installation robot to traverse the studded wall such that each of the first one of the selected one or more suitable layer materials and the second one of the selected one or more suitable layer materials unspools along the wall as the drywall installation robot traverses the studded wall;

using the one or more sprayers on the drywall installation robot to spray a fill material between the first one of the selected one or more suitable layer materials and the second one of the selected one or more suitable layer materials; and allowing the fill material to dry between the first one of the selected one or more suitable layer materials and the second one of the selected one or more suitable layer materials to produce finished drywall.

* * * * *